United States Patent [19]

Eschner

[11] Patent Number: 5,603,887
[45] Date of Patent: Feb. 18, 1997

[54] PROCESS OF MAKING REFRACTORY FIBER STRUCTURES

[75] Inventor: Axel Eschner, Wiesbaden, Germany

[73] Assignee: Didier-Werke AG, Wiesbaden, Germany

[21] Appl. No.: 568,431

[22] Filed: Dec. 6, 1995

Related U.S. Application Data

[62] Division of Ser. No. 366,446, Dec. 30, 1994, which is a continuation of Ser. No. 73,064, Jun. 8, 1993, abandoned.

[30] Foreign Application Priority Data

Aug. 26, 1992 [DE] Germany ............................ 42 28 355.8

[51] Int. Cl.$^6$ .................................................. B28B 3/00
[52] U.S. Cl. ............................................ 264/333; 264/123
[58] Field of Search ...................................... 264/123, 333

[56] References Cited

U.S. PATENT DOCUMENTS

| | | | |
|---|---|---|---|
| 4,002,484 | 1/1977 | Baudouin ........................... | 106/306 |
| 4,162,923 | 7/1979 | Schmitt et al. ..................... | 106/104 |
| 4,737,326 | 4/1988 | Wirth et al. ....................... | 264/56 |
| 5,045,506 | 9/1991 | Dube et al. ........................ | 501/35 |
| 5,250,488 | 10/1993 | Thelohan et al. .................. | 501/36 |
| 5,346,868 | 9/1994 | Eschner ............................. | 501/95 |

FOREIGN PATENT DOCUMENTS

| | | |
|---|---|---|
| 6362 | 1/1980 | European Pat. Off. . |
| 0016369 | 10/1980 | European Pat. Off. . |
| 2118026 | 7/1972 | France . |
| 2732387 | 11/1978 | Germany . |
| WO92/09536 | 6/1992 | WIPO . |

OTHER PUBLICATIONS

Wallenberger et al., "Calcium Aluminate Glass Fibers: Drawing from Supercooled Melts Versus Inviscid Melt Spinning", Materials Letters, 11 (1991) Jul. No. 8/9, Amsterdam, NL.

*Primary Examiner*—Christopher Raimund
*Attorney, Agent, or Firm*—Wenderoth, Lind & Ponack

[57] ABSTRACT

The invention relates to a process of making fiber structures in the form of refractory light-weight moldings. These fiber structures exhibit the advantage that they do not contain, or contain virtually no harmful fibers, and/or that such fibers that might still exist in the fiber structures can be readily decomposed by water or body fluids. Nevertheless, the fiber structures exhibit the advantageous thermal and mechanical properties of conventional light-weight moldings. The fiber structures according to the invention are manufactured using inorganic fibers, wherein at least 90% by weight of each fiber comprises 20–50% by weight of CaO and 50–80% by weight of $Al_2O_3$. The rest comprises a maximum of 10% by weight of typical impurity oxides. Water or a water-containing liquid is used as the charge liquid, and conventional refractory additives may also be added to the mixture of fibers and water to be molded.

3 Claims, 3 Drawing Sheets

PROCESS OF MAKING REFRACTORY FIBER STRUCTURES

This is a divisional application of Ser. No. 08/366,446 filed Dec. 30, 1994, pending, which is a continuation application of Ser. No. 08/073,064, filed Jun. 8, 1993, now abandoned.

BACKGROUND OF THE INVENTION

The present invention relates to fiber structures in the form of refractory light-weight moldings.

Fiber-containing light-weight moldings are well-known products. They are made of mineral or refractory fibers with or without the addition of customary additives and loading materials. DE-AS 27 32 387 discloses mineral fiber boards which are made by saturating a mineral fiber board, prebonded by means of an organic plastic binder, with an aqueous suspension of a bonding clay and subsequently solidifying by annealing. Boards, containing inorganic fibers in a matrix comprising plastic clay as reinforcement, are known from EP 0 006 362. Mineral fibers, asbestos or refractory fibers of $Al_2O_3$ are used in such fiber boards.

State of the art ceramic fibers from the system $Al_2O_3$-$SiO_2$ with 40–75% by weight of $Al_2O_3$ and no more than 2% by weight of alkaline- and alkaline earth oxide are X-ray amorphous, and prior art fibers with 80–95% by weight of $Al_2O_3$, the rest being $SiO_2$, are crystalline. Such fibers are used for thermal insulation at raised temperatures as mats and fibrous moldings, and for the manufacture of reinforced ceramic or metallic moldings.

The prior art ceramic fibers have a high resistance to water, i.e. they do not dissolve in water or in physiological solutions, or they dissolve only after a very long period of time. When heat is applied, the fibers crystallize out; or in the case of fibers that are already crystalline, such fibers show additional crystal growth. The form factor of the fiber, characterized by the length to diameter ratio, remains preserved in all cases. In addition, the X-ray amorphous fibers form, on account of their high $SiO_2$ content, upon the application of heat, cristobalite, which causes silicosis.

Furthermore, there exists the idea that ceramic fibers can be cancer-causing, for which their resistance to dissolving in water or in body fluids is regarded as an important reason. They remain preserved in the body as fine fibrous foreign bodies similar to asbestos fibers, and could lead to irritations. Values for the so-called "network dissolution rate" and the residence time of different fibers in liquid are known from "Keramik und Glas", Reports of the Professional Association of the Ceramic and Glass Industry, March 1992, No. 1, pages 30–41, in particular pages 38–40.

SUMMARY OF THE INVENTION

The object of the invention is fiber structures in the form of refractory light-weight structures, in whose manufacture fibers are used that are as free of $SiO_2$ as possible, whose thermal and mechanical properties do not differ significantly from prior art fiber structures, and which, following solidification, contain only a few or no actual fibers at all, so that such fiber structures according to the invention can not be expected to be dangerous to one's health.

This object can be achieved by employing a particular inorganic fiber in the fiber structures, wherein such inorganic fiber is based on CaO and $Al_2O_3$.

DESCRIPTION OF THE PREFERRED EMBODIMENTS

Figure 1:
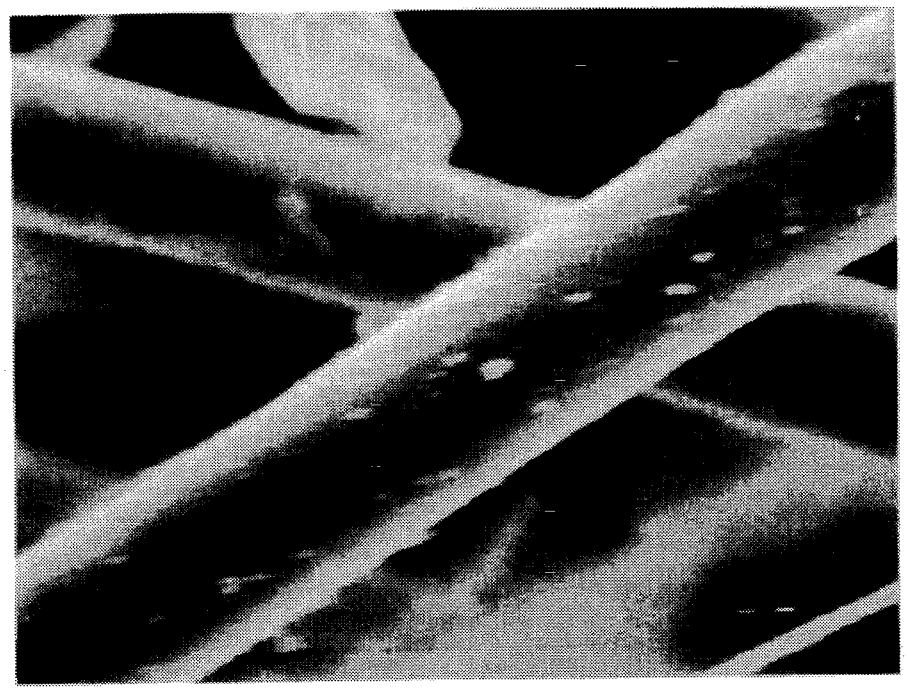
FIG. 1 is a photograph taken with a scanning electron microscope, of the inorganic fibers employed in the present invention.

The fiber structures of the present invention, in the form of refractory light-weight moldings, in particular boards, serve to solve the problem discussed above. The fiber structures are manufactured using inorganic fibers, wherein at least 90% by weight of each fiber comprises 20–50% by weight of CaO and 50–80% by weight of $Al_2O_3$, based on the weight of the fiber. The rest comprises a maximum of 10% by weight of typical impurity oxides. Water or a water-containing liquid is used as a charge liquid for producing the moldings, and the moldings optionally contain the conventional refractory additives.

The inorganic fiber having a raised calcium oxide content can not be called a ceramic fiber according to CEN (European Committee on Standards) document CEN/TC 187/WG3/N27, January 1992, since such inorganic fiber contains less than 2% by weight of alkaline and alkaline earth oxides.

The inorganic fibers, as defined above and applied in the manufacture of fiber structures according to the invention, are new products, which are described in detail in a U.S. patent application entitled "Inorganic Fiber" (Attorney Docket No. 59/PA 4056) filed on the same day as the present application on behalf of the same inventor.

These inorganic fibers can be produced by melting a mixture of alumina and calcinated lime in amounts to produce the inorganic fiber, and forming the resultant melt into fibers, for example, by a blowing process or centrifugal process.

The composition of the fibers, 90% of which comprises 20–50% by weight of CaO and 50–80% by weight of $Al_2O_3$, is based in essence on the CaO-$Al_2O_3$ system. The composition of the fibers is chosen in such a manner that it corresponds to that of calcium-aluminate cements.

The customary refractory additives used at high temperatures in thermal insulation technology can be used, e.g. in the form of fine particles as additives and loading materials in the present invention, in an amount of preferably up to 50% by weight based on the weight of the molding. Examples are aluminum oxide, clay, $ZrO_2$, $TiO_2$, organic fibers or organic fine-particle substances such as burning out substances, surfactants and other auxiliary substances.

In the manufacture of the fibers used according to the invention, the typical starting substances can be used as in the manufacture of calcium-aluminate cements. Furthermore, typical auxiliary substances, which are to be added in small amounts, such as anhydride ($CaSO_4$), can also be added to the fibers.

Typical oxidic impurities in calcium-aluminate cements are MgO, $TiO_2$, iron oxide and $SiO_2$, which can, therefore, also be present in the fibers of the invention. Their total amount should not exceed, however, a maximum of 10% by weight, based on the total composition of the fibers, and in particular a maximum of 5% by weight, based on the weight of the fiber. In particular, the $SiO_2$ content should not exceed 1.5% by weight, preferably 0.8% by weight, based on the weight of the fiber.

The fibers of the invention can be produced according to the known methods for manufacturing mineral fibers, e.g. by a blowing process or centrifugal process.

The fibers of the invention that are produced from the liquid melt of the starting substances, in particular by blowing, are largely X-ray amorphous; they hydrate and decompose upon contact with water, losing their fiber structure. Preferably, at least 60% by weight of the fiber is X-ray amorphous.

The fibers of the invention have the usual dimensions, preferably a diameter ranging from 1 to 5 µm and an average diameter of 3 µm, and a length of >20 µm. Preferably the maximum diameter is 10 µm.

It has been demonstrated, surprisingly, that such fibers hydrate in water after just a few days and begin to lose their fiber structure.

The process for producing the refractory molding according to the present invention comprises providing a mixture containing water and inorganic fibers, wherein at least 90% by weight of each inorganic fiber comprises 20–50% by weight of CaO and 50–80% by weight of $Al_2O_3$, based on the weight of the fiber; molding the mixture by compression molding; and storing the resultant molding at room temperature for hydration and formation of a hydraulic setting.

In the manufacture of the fiber moldings according to the invention, the initial mixture comprising fibers, optionally additives, and water, is left to stand, therefore, without dewatering, until the mixture has hardened and the fibers have largely or totally lost their fiber shape, whereby the initial mixture has to be prepared, of course, with an adequate amount of water. The amount of water to be added is generally at least 5 to 20% by weight, based on the total initial mixture, i.e. the ratio between fibers and additives (if present) to water preferably lies in a range of 95:5 to 80:20.

If the refractory additives are present in the mixture, the weight ratio of inorganic fibers to the refractory additives is preferably 90:10 to 50:50.

The inorganic fiber, which is used according to the invention, decomposes progressively in the presence of water or body fluid by means of hydration and loses the fiber structure with increasing hydration, and is thus no longer harmful on the ground of its form factor as a fiber after a relatively short time span of water contact. This is advantageous both in the received state of the fibers and processing into the fiber structures according to the invention. If during such production, the fibers used according to the invention are breathed in, they decompose within a maximum of a few days, so that there is no risk of silicosis.

Therefore, after the production of the fiber structures, the fibers have largely or totally decomposed or have lost their shape of pointed fibers, which can represent a danger to one's health, so that at a subsequent eruption of the fiber structures of the invention, or the dumping of their waste, no special precautionary measures have to be taken.

The inorganic fibers used in the production of the fiber structures according to the invention can be made as follows.

PRODUCTION EXAMPLE 1

A mixture comprising 50% by weight of alumina and 50% by weight of calcinated lime was compacted into pellets. The pellets were melted at 1650° C. in a furnace, and the melt was blown with compressed air.

In so doing, fibers having a diameter of up to 8 µm and an average fiber diameter of 3 µm were obtained. When stored in water, these fibers showed a beginning hydration after just 4 hours; and after 2 days the fibers had largely decomposed. Examination with a scanning electron microscope (REM) could no longer demonstrate any fibers on the dried sample of the fibers stored in water for 2 days.

FIG. 1 is a photograph taken with the scanning electron microscope, of fibers following their manufacture, the photograph being enlarged 2100 x.

Figure 2:
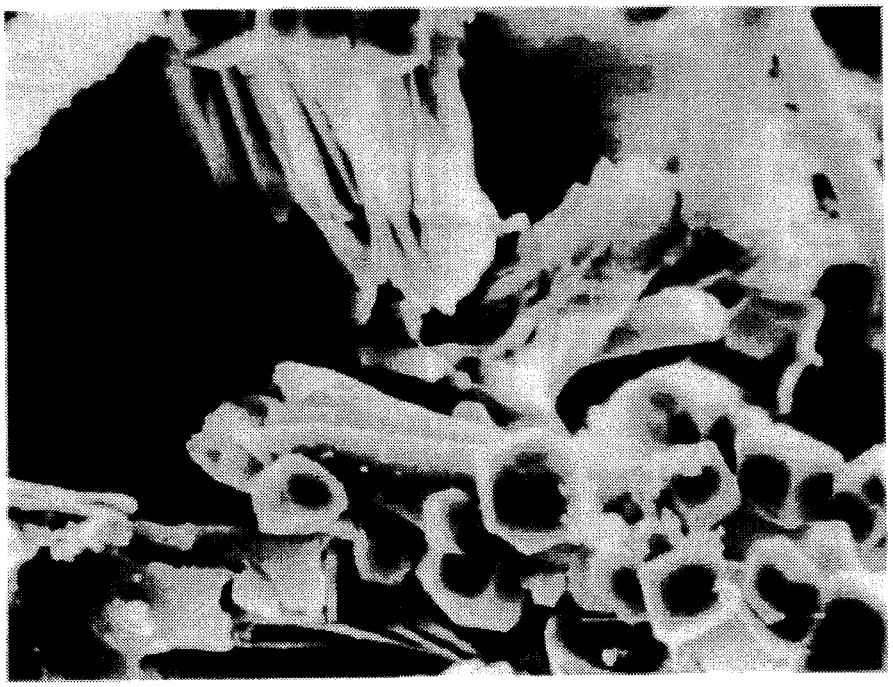
FIG. 2 is a photograph, also taken with a scanning electron microscope, of the inorganic fibers employed in the present invention after they have been stored in water for 2 days.

FIG. 2 is a photograph taken with the scanning electron microscope, of fibers stored in water for 2 days, the photograph being enlarged 2000 x.

It is clear from a comparison of these 2 photographs that the fibers had almost totally lost their fiber structure or their fiber form factor after storage in water for 2 days.

PRODUCTION EXAMPLE 2

Fibers of another starting mixture with 63% by weight of alumina, 30% by weight of calcinated lime, 5% by weight of calcium sulfate and 2% by weight of impurity oxides ($Fe_2O_3$, MgO, $SiO_2$) lead to the same results as the fibers, described above, of the mixture with 50% by weight of alumina and 50% by weight of calcined lime the manufacture of these fibers, as in Production Example 1, the starting mixture was melted at 1650° C. and blown into fibers.

The inorganic fibers described above can be processed by a well-known method into fiber structures, as shown below.

EXAMPLE 1

Fibers made from a mixture of 50% by weight of-clay-and 50% by weight of calcinated lime, according to Production Example 1, in an amount of 90 parts by weight of fibers, are added to 10 parts by weight of water to form a molding composition which is then compressed into moldings (boards) at a molding pressure of 1 $N/m^2$.

Figure 3:
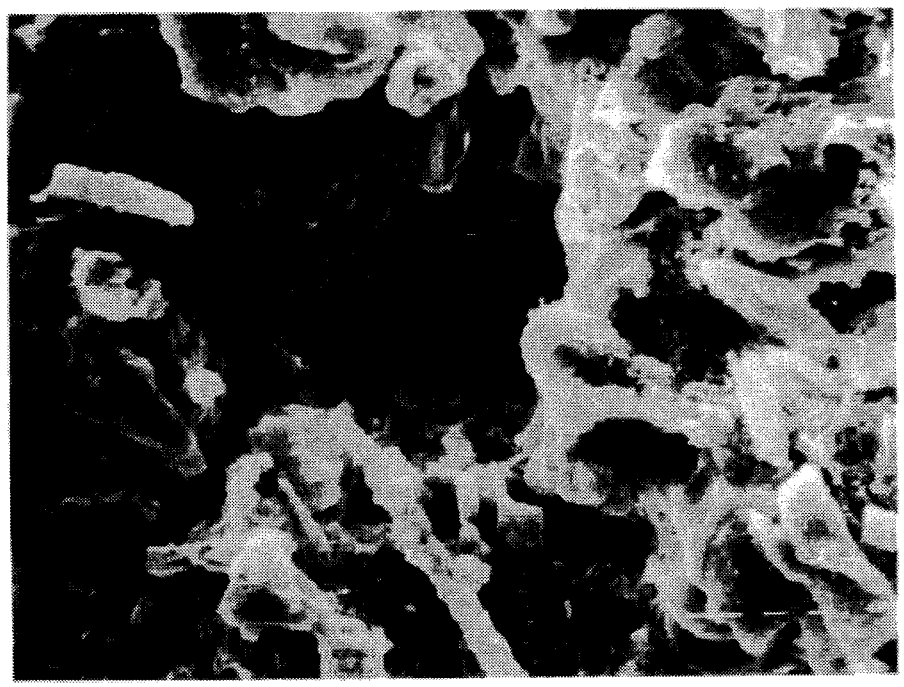
FIG. 3 is a photograph taken with a scanning electron microscope, of a molding of the present invention after firing at 1,000° C.

The moldings were stored at 25° C., 100% atmospheric humidity, for 24 hours, whereby the fibers were largely hydrated, resulting in a hydraulic setting. In this manner, a light-weight structural panel was obtained in which the fibers had largely decomposed, but that exhibited high porosity with simultaneously high mechanical strength and outstanding refractory properties. Upon subsequent firing at 1,000° C., the moldings proved to be dimensionally stable. Examination with the scanning electron microscope could demonstrate only a few residual fibers (FIG. 3).

EXAMPLE 2

A molding composition was prepared from the inorganic fibers obtained in Production Example 2, fine-particle aluminum oxide as additive or loading material, and water, in the following mixing proportion: 60 parts by weight of fibers, 30 parts by weight of fine-particle aluminum oxide (fired and ground bauxite), 10 parts by-weight of water. Further processing took place according to the procedure specified in Example 1.

A light-weight molding with outstanding mechanical and thermal insulating properties was obtained, since despite the fiber structure that had been lost, the porosity had remained preserved as in the use of mineral fibers that do not change their structure.

I claim:

1. A process for producing a refractory molding, which process comprises:

providing a mixture containing water and inorganic fibers, wherein at least 90% by weight of each inorganic fiber consists of CaO and $Al_2O_3$ in a weight ratio of 1:1 to 1:4 and wherein each inorganic fiber contains no more than 1.5% by weight of $SiO_2$, said inorganic fibers having a maximum diameter of 10 μm such that the fibers hydrate and decompose upon contact with water, molding the mixture by compression molding, and storing the resultant molding at room temperature until the mixture has hardened wherein the water comprises at least 5% by weight of the mixture based on the total weight of the mixture.

2. The process as claimed in claim 1, wherein the mixture further contains refractory additives.

3. The process as claimed in claim 2, wherein the mixture contains the inorganic fibers and the refractory additives in a weight ratio of 90:10 to 50:50.

* * * * *